US012031995B2

(12) United States Patent
Hiroki et al.

(10) Patent No.: US 12,031,995 B2
(45) Date of Patent: Jul. 9, 2024

(54) AUTOMATIC ANALYSIS DEVICE

(71) Applicant: Hitachi High-Tech Corporation, Tokyo (JP)

(72) Inventors: Kohei Hiroki, Tokyo (JP); Akihiro Yasui, Tokyo (JP); Hiroyuki Mishima, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 690 days.

(21) Appl. No.: 17/269,405

(22) PCT Filed: Aug. 21, 2019

(86) PCT No.: PCT/JP2019/032542
§ 371 (c)(1),
(2) Date: Feb. 18, 2021

(87) PCT Pub. No.: WO2020/054336
PCT Pub. Date: Mar. 19, 2020

(65) Prior Publication Data
US 2021/0247412 A1 Aug. 12, 2021

(30) Foreign Application Priority Data
Sep. 12, 2018 (JP) ................. 2018-170135

(51) Int. Cl.
*B01L 3/00* (2006.01)
*B01F 23/00* (2022.01)
(Continued)

(52) U.S. Cl.
CPC ... *G01N 35/1002* (2013.01); *G01N 35/00732* (2013.01); *G01N 35/1079* (2013.01)

(58) Field of Classification Search
CPC ......... G01N 35/1002; G01N 35/00732; G01N 35/1079; G01N 2035/00673;
(Continued)

(56) References Cited

U.S. PATENT DOCUMENTS 5,314,825 A    5/1994 Weyrauch et al.
2010/0001854 A1 1/2010 Kojima
(Continued)

FOREIGN PATENT DOCUMENTS

EP      3078972 A1    10/2016
JP      2011-227048 A 11/2011
(Continued)

OTHER PUBLICATIONS

PCT/JP2019/032542 International Search Report, Nov. 5, 2019, 2 pgs.
(Continued)

*Primary Examiner* — Jennifer Wecker
*Assistant Examiner* — Oyeleye Alexander Alabi
(74) *Attorney, Agent, or Firm* — Volpe Koenig

(57) ABSTRACT

Provided is an automatic analysis device that can suppress concentration of a reagent made to react with a specimen. This automatic analysis device is provided with: a reagent container which accommodates a reagent and which has attached thereto a perforable lid; a perforation unit for perforating the lid; and a reagent suction nozzle that is inserted into a hole formed by perforation and that sucks up the reagent. The automatic analysis device is characterized by being further provided with a state storage unit that stores the state as to whether the reagent container is in an unused state or in a used state, and a state update unit that, when the lid is perforated by the perforation unit while the reagent container is in an unused state, updates the state stored in the state storage unit to the used state.

7 Claims, 7 Drawing Sheets

(51) Int. Cl.
*B01F 23/41* (2022.01)
*B01F 101/23* (2022.01)
*B23Q 17/24* (2006.01)
*C12M 1/34* (2006.01)
*C12Q 1/04* (2006.01)
*C12Q 1/18* (2006.01)
*C12Q 1/686* (2018.01)
*G01N 21/3577* (2014.01)
*G01N 21/359* (2014.01)
*G01N 21/39* (2006.01)
*G01N 21/45* (2006.01)
*G01N 21/64* (2006.01)
*G01N 30/12* (2006.01)
*G01N 30/68* (2006.01)
*G01N 30/70* (2006.01)
*G01N 30/72* (2006.01)
*G01N 30/88* (2006.01)
*G01N 33/00* (2006.01)
*G01N 33/18* (2006.01)
*G01N 33/50* (2006.01)
*G01N 33/68* (2006.01)
*G01N 35/00* (2006.01)
*G01N 35/10* (2006.01)

(58) Field of Classification Search
CPC .......... G01N 2035/00811; G01N 2035/00821; G01N 2035/00851; G01N 2035/009; G01N 2035/0443; G01N 2035/0444
See application file for complete search history.

(56) References Cited

U.S. PATENT DOCUMENTS

| | | | |
|---|---|---|---|
| 2010/0093097 A1 | 4/2010 | Kawamura | |
| 2011/0244558 A1* | 10/2011 | Hamada | G01N 35/00663 422/68.1 |
| 2011/0244580 A1 | 10/2011 | Hamada et al. | |
| 2012/0025954 A1* | 2/2012 | Takayama | G01N 35/00732 435/283.1 |
| 2018/0038879 A1 | 2/2018 | Nishimura et al. | |
| 2018/0341795 A1* | 11/2018 | Bowden | B01L 3/545 |

FOREIGN PATENT DOCUMENTS

| | | |
|---|---|---|
| JP | 2013-011619 A | 1/2013 |
| JP | 2013-174536 A | 9/2013 |
| JP | 2013-253813 A | 12/2013 |
| JP | 2015-021943 A | 2/2015 |
| JP | 2015021943 A * | 2/2015 |
| WO | 2016/139997 A1 | 9/2016 |

OTHER PUBLICATIONS

Extended European Search Report issued on Apr. 8, 2022 for European Patent Application No. 19858918.6.
Chinese Office Action issued on Sep. 27, 2023 for Chinese Patent Application No. 201980052596.0.

* cited by examiner

FIG. 7

| IDENTIFICATION CODE | STATE | UPDATE DATE AND TIME | ABSORPTION AMOUNT |
|---|---|---|---|
| ID001 | UNUSED | — | — |
| ID002 | UNUSED | — | — |
| ID003 | USED | Y3/M3/D3 h3:m3 | V3 |
| ID004 | USED | Y4/M4/D4 h4:m4: | V4 |

AUTOMATIC ANALYSIS DEVICE

TECHNICAL FIELD

The present invention relates to an automatic analysis device for analyzing a specimen such as blood or urine, and particularly relates to a technique for reducing a change in concentration of a reagent used for analysis.

BACKGROUND ART

An automatic analysis device is used in a hospital or an examination facility in order to quantitatively or qualitatively analyze a specific component contained in a specimen such as blood or urine supplied by a patient, and is necessary for diagnosis of the patient. Various reagents are used for analysis of the specimen by the automatic analysis device. The reagent is accommodated in a reagent container of a perforation type or an opening type. The perforation type is a type in which a perforable lid is attached to the reagent container, the lid is perforated during use, and the reagent is absorbed through a nozzle inserted into the formed hole. The opening type is a type in which an openable and closable lid attached to an opening of the reagent container is removed at the time of use, and the reagent is absorbed through a nozzle inserted into the opening. Since the hole formed by perforation is smaller than the opening, the perforation type makes it easy to prevent the concentration of the reagent due to evaporation, and the opening type allows nozzle insertion and cleaning to be performed in a short time. Each type has advantages and disadvantages.

Patent Literature 1 discloses an automatic analysis device that, in order to maintain processing capacity without degrading even when the perforation type reagent container and the opening type reagent container are mixed, determines which type of the reagent container is used and controls each operation time of reagent absorption and nozzle cleaning according to a determination result.

CITATION LIST

Patent Literature

Patent Literature 1: JP-A-2013-174536

SUMMARY OF INVENTION

Technical Problem

However, in Patent Literature 1, since the lid of the reagent container mounted on a reagent disk that holds the reagent container is perforated regardless of whether the reagent is used, concentration of the reagent proceeds from the perforation of the lid to the start of use of the reagent. Therefore, an analysis result may be adversely affected.

Therefore, an object of the invention is to provide an automatic analysis device capable of further preventing concentration of a reagent to be reacted with a specimen.

Solution to Problem

In order to achieve the above object, the invention provides an automatic analysis device including: a reagent container in which a reagent is accommodated and to which a perforable lid is attached; a perforation unit that perforates the lid; and a reagent absorption nozzle that is inserted in a hole formed by perforation and that absorbs the reagent. The automatic analysis device further includes: a state storage unit that stores whether a state of the reagent container is an unused state or a used state; and a state updating unit that, when the lid is perforated by the perforation unit when the state of the reagent container is the unused state, updates the state stored in the state storage unit to the used state.

Further, the invention provides an automatic analysis device including: a reagent container in which a reagent is accommodated and to which a perforable lid is attached; a perforation unit that perforates the lid; a reagent absorption nozzle that is inserted in a hole formed by perforation and that absorbs the reagent; and a reagent disk on which the reagent container is mounted. The automatic analysis device further includes: an RFID tag attached to the reagent container and storing whether a state of the reagent container is an unused state or a used state; and an RFID reader/writer provided on the reagent disk to read and write the RFID tag.

Advantageous Effect

According to the invention, it is possible to provide an automatic analysis device capable of further preventing concentration of a reagent to be reacted with a specimen.

BRIEF DESCRIPTION OF DRAWINGS

FIG. 7 is a diagram showing an example of a state table used in the second embodiment.

DESCRIPTION OF EMBODIMENTS

Figure 1:
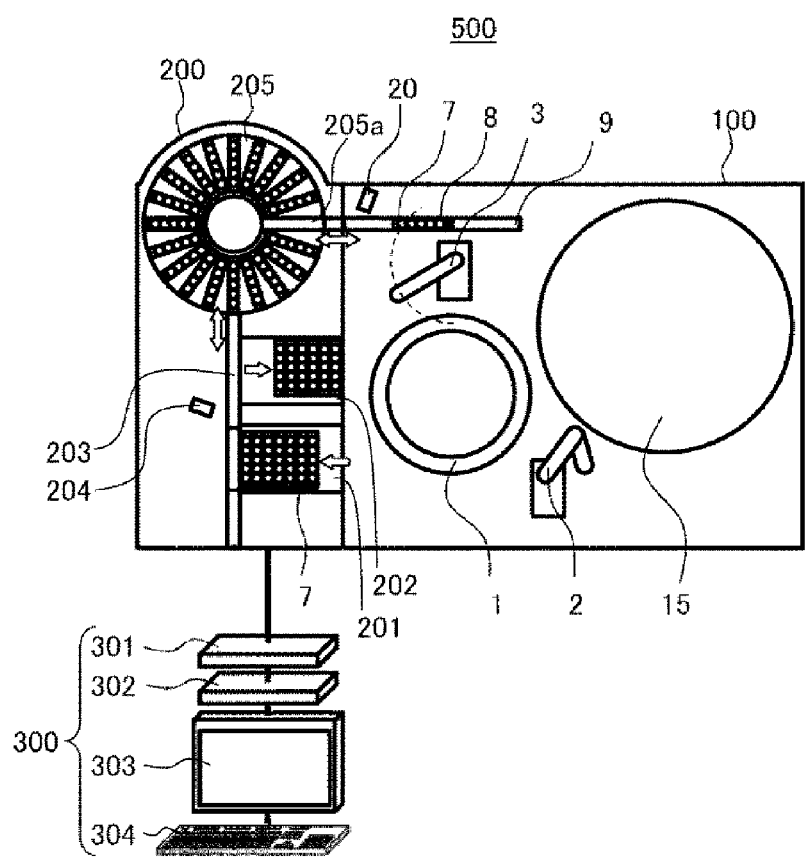
FIG. 1 is a schematic diagram showing a configuration example of an automatic analysis device.

Hereinafter, preferred embodiments of an automatic analysis device according to the invention will be described with reference to the accompanying drawings. In the following description and the accompanying drawings, components having the same function and structure are denoted by the same reference numerals, and repeated description thereof will be omitted.

First Embodiment

An example of an overall configuration of an automatic analysis device 500 will be described with reference to FIG. 1. The automatic analysis device 500 is a device for quantitatively or qualitatively analyzing a specific component contained in a specimen such as blood or urine supplied by a patient, and includes an analysis module 100, a rack transport module 200, and a control device 300. Although one analysis module 100 is provided in FIG. 1, a plurality of analysis modules 100 may be provided. Hereinafter, each unit will be described.

The analysis module 100 is a module that dispenses the specimen into a reaction disk 1, mixes the specimen with a reagent, and then performs quantitative analysis or qualitative analysis. Examples of an analysis method include a comparative color analysis using a reagent that changes color by reacting with the specific component in the specimen, and an immunoanalysis using a reagent obtained by adding a labeling body to a substance that directly or indirectly binds to the specific component in the specimen and counting the labeling body. The specimen is accommodated in a specimen container 8 to which an identification medium such as a bar code is attached. A specimen rack 7 on which a plurality of specimen containers 8 are mounted is transported by a rack transport mechanism 9. A specimen identified by an identification device 20 reading the identification medium of the specimen container 8 is dispensed to the reaction disk 1 by a specimen dispensing mechanism 3. The reagent is dispensed from a reagent disk 15 to the reaction disk 1 by a reagent dispensing mechanism 2. The specimen mixed with the reagent is referred to as a reaction liquid. A periphery of the reaction disk 1 will be described later with reference to FIG. 2.

The rack transport module 200 is a module that transports the specimen rack 7 to the analysis module 100 and collects the specimen rack 7 from the analysis module 100. The specimen rack 7 put into a rack supply unit 201 is transported to a rack rotor 205 by a rack transport line 203. The specimen container 8 mounted on the specimen rack 7 transported on the rack transport line 203 is identified by the identification medium being read by a specimen identification device 204. The rack rotor 205 has a plurality of slots 205a on which the specimen rack 7 is mounted, and transfers the specimen rack 7 between the rack transport mechanism 9 of the analysis module 100 and the slots 205a. The specimen rack 7 collected from the analysis module 100 is stored in a rack storage unit 202.

The control device 300 is a device that controls an operation of the automatic analysis device 500, and includes a control unit 301, a storage unit 302, a display unit 303, and an input unit 304. The display unit 303 is a liquid crystal display or the like, and displays a screen for setting various parameters, an analysis result, and the like. The input unit 304 is a keyboard, a mouse, a touch panel, or the like, and is used for setting the various parameters, inputting information related to analysis, instructing start of analysis, and the like. The storage unit 302 is a memory, a hard disk, a solid state drive (SSD), or the like, and stores the various parameters, the information related to the analysis, the analysis result, and the like. The control unit 301 is a central processing unit (CPU) or the like, and executes control of the operation of each unit, calculation related to the control, and the like.

Figure 2:
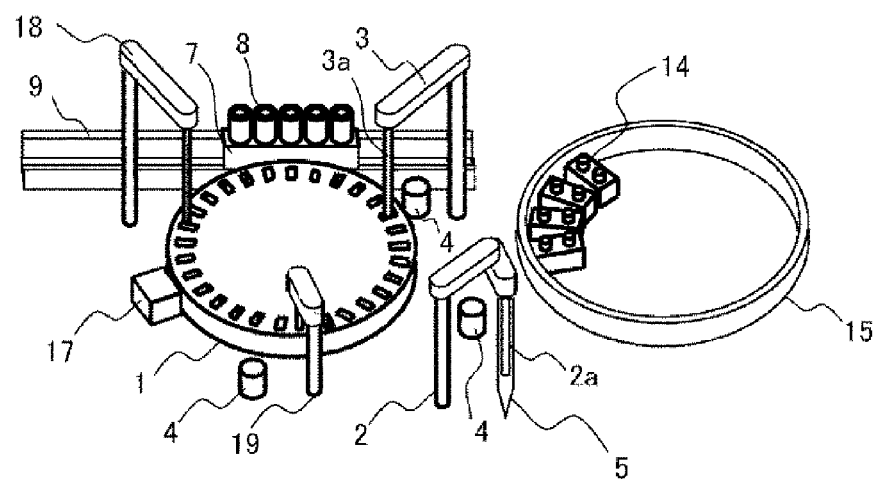
FIG. 2 is a perspective view showing a configuration example of a periphery of a reaction disk.

A configuration of the periphery of the reaction disk 1 and a flow from the dispensing of the specimen to the analysis of the specimen will be described with reference to FIG. 2. The specimen container 8 containing the specimen such as blood or urine is mounted on the specimen rack 7 and is transported to the vicinity of the reaction disk 1 by the rack transport mechanism 9. The specimen in the specimen container 8 is absorbed by a specimen dispensing nozzle 3a of the specimen dispensing mechanism 3 and dispensed by being discharged to a reaction container 16 of the reaction disk 1. The specimen dispensing mechanism 3 moves on an arc between a specimen absorption position on the rack transport mechanism 9 and the reaction container 16 which is at a specimen discharging position on the reaction disk 1, and moves up and down at the specimen absorption position and the specimen discharging position. The specimen dispensing nozzle 3a has a straw shape. After the specimen is dispensed, cleaning and drying are performed in a cleaning and drying tank 4.

The reaction container 16 containing the specimen moves to the vicinity of the reagent disk 15 as the reaction disk 1 rotates. The reagent disk 15 is equipped with a reagent container 14 to which a perforable lid is attached and in which the reagent is accommodated. The reagent container 14 containing the reagent used for analysis moves to the vicinity of the reaction disk 1 by the rotation of the reagent disk 15. The reagent in the reagent container 14 is absorbed by a reagent dispensing nozzle 2a of the reagent dispensing mechanism 2 after the lid of the reagent container 14 is perforated by a pierce 5 which is a perforation unit attached to the reagent dispensing mechanism 2, and is dispensed by being discharged to the reaction container 16 containing the specimen. The pierce 5 is attachable to and detachable from the reagent dispensing nozzle 2a or another portion of the reagent dispensing mechanism 2, is attached to the reagent dispensing mechanism 2 when the lid of the reagent container 14 is perforated, and is removed from the reagent dispensing mechanism 2 when the reagent is absorbed and discharged. The reagent dispensing mechanism 2 moves on an arc between a reagent absorption position on the reagent disk 15 and the reaction container 16 which is at a reagent discharging position on the reaction disk 1, and moves up and down at the reagent absorption position and the reagent discharging position. The reagent dispensing nozzle 2a has a straw shape. After the reagent is dispensed, cleaning and drying are performed in the cleaning and drying tank 4. After the perforation, the pierce 5 is also cleaned and dried in the cleaning and drying tank 4. The reagent disk 15, which is a main part in the present embodiment, will be described later with reference to FIG. 3.

The reaction container 16 containing the specimen and the reagent moves to the vicinity of a stirring mechanism 19 as the reaction disk 1 rotates. The stirring mechanism 19 includes, for example, a stirring blade provided at a tip end. By infiltrating the stirring blade into the reaction container 16 and rotating, the stirring mechanism 19 stirs and mixes the specimen and the reagent in the reaction container 16 to generate the reaction liquid. After the reaction liquid is generated, the stirring blade is cleaned and dried in the cleaning and drying tank 4.

The reaction container 16 containing the reaction liquid moves to the vicinity of a spectrophotometer 17 as the reaction disk 1 rotates. The spectrophotometer 17 is a measurement device that measures absorbance of the reaction liquid by measuring light passing through the reaction liquid in the reaction container 16. A concentration of the specific component in the specimen is calculated based on the measured absorbance and a calibration curve prepared in advance.

After the measurement by the spectrophotometer 17, the reaction container 16 moves to the vicinity of a cleaning mechanism 18 as the reaction disk 1 rotates. The cleaning mechanism 18 absorbs the reaction liquid from the reaction container 16 by a vacuum pump, and cleans the inside of the reaction container 16 by a cleaning pump.

Figure 3:
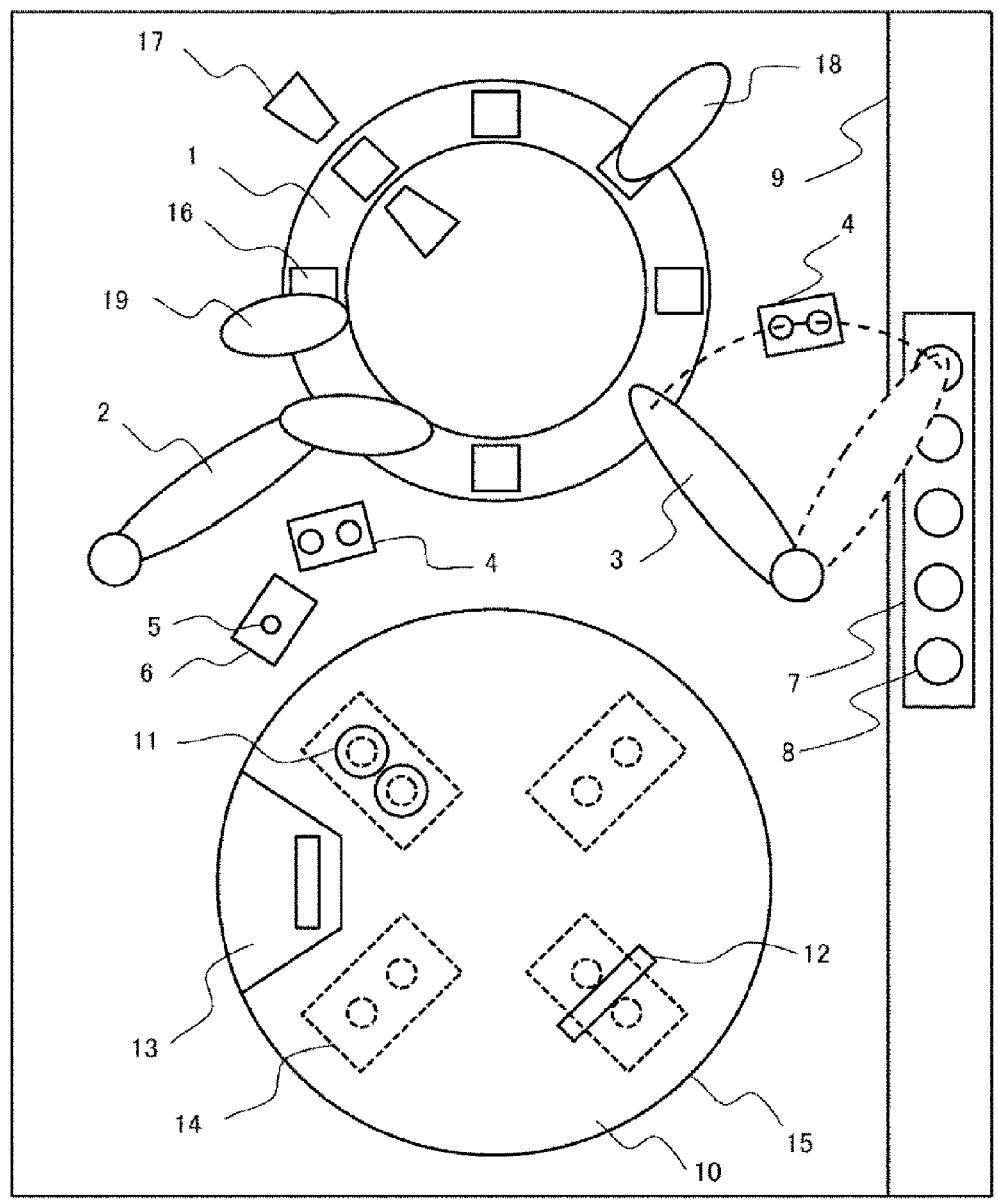
FIG. 3 is a plan view showing a configuration example of the periphery of the reagent disk covered with a reagent jacket.

The reagent disk 15, which is the main part in the present embodiment, will be described with reference to FIG. 3. FIG. 3 is a plan view when the reagent disk 15 is covered with a reagent jacket 10. The reagent container 14 under the reagent jacket 10 is indicated by a dotted line. The reagent jacket 10 covers the reagent disk 15, and has a reagent absorption port 11, an RFID reader/writer 12, and a reagent jacket lid 13. Hereinafter, each part will be described.

The absorption port 11 is a hole provided in the reagent jacket 10. The pierce 5 attached to the reagent dispensing mechanism 2 and the reagent dispensing nozzle 2a of the reagent dispensing mechanism 2 are inserted into the reagent absorption port 11. By the rotation of the reagent disk 15, the lid of the reagent container 14 mounted on the reagent disk 15 is disposed at the position of the reagent absorption port 11. Therefore, the pierce 5 perforates the lid through the reagent absorption port 11, and the reagent dispensing nozzle 2a absorbs the reagent from the hole formed by the perforation. Even when the reagent disk 15 rotates, the reagent jacket 10 does not rotate. The pierce 5 removed from the reagent dispensing nozzle 2a is held in a pierce holding container 6.

The RFID reader/writer 12 is a device that reads and writes an RFID tag attached to the reagent container 14 mounted on the reagent disk 15, and functions as a state updating unit. The RFID tag stores information related to the reagent accommodated in the reagent container 14, and a state of the reagent container 14, for example, whether the reagent container 14 is unused and the lid is not perforated, or whether the reagent container 14 is used and the lid is perforated. That is, the RFID tag functions as a state storage unit. The RFID reader/writer 12 reads the RFID tag to acquire the information related to the reagent and the state of the reagent container 14. The RFID reader/writer 12 writes on the RFID tag to update the state of the reagent container 14. For example, when the lid of the unused reagent container 14 is perforated, the RFID reader/writer 12 updates the state of the reagent container 14 stored in the RFID tag to a used state. Since the state stored in the RFID tag is updated to the used state after the lid of the reagent container 14 is perforated and the reagent in the reagent container 14 is used, the concentration of the reagent can be further prevented.

The reagent jacket lid 13 is a lid that closes a hole for loading and unloading the reagent container 14 into and from the reagent disk 15, and is attachable to and detachable from the reagent jacket 10.

Figure 4:
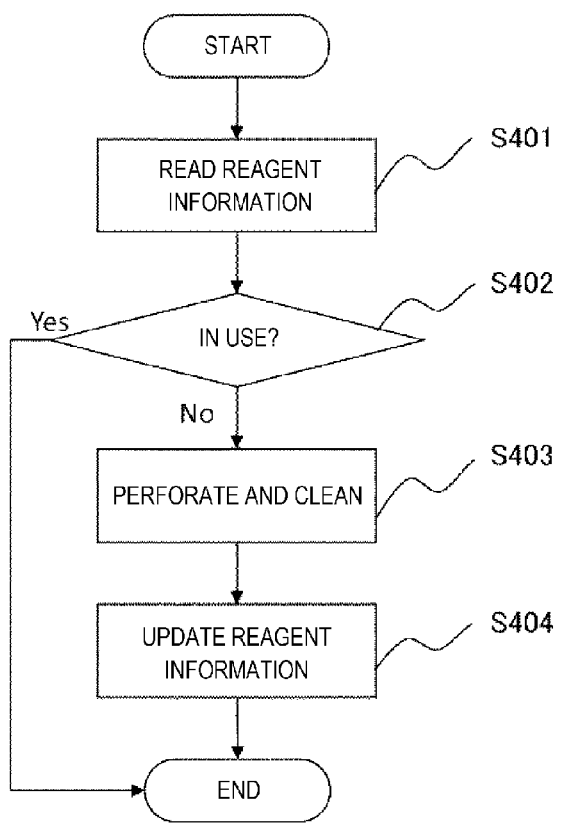
FIG. 4 is a diagram showing an example of a flow of processing according to a first embodiment.

The flow of the processing in the present embodiment will be described with reference to FIG. 4.

(S401)
Reagent information from the RFID tag attached to the reagent container 14 mounted on the reagent disk 15 is read by the RFID reader/writer 12. The reagent information acquired by reading by the RFID reader/writer 12, for example, a type of the reagent and the state of the reagent container 14, is transmitted to the control unit 301 of the control device 300.

(S402)
The control 1 unit 301 determines whether the reagent container 14 is in the used state. When it is in the used state, the processing flow ends. When it is not in the used state, that is, when it is in an unused state, the processing moves to S403.

(S403)
The control unit 301 causes the pierce 5 to be attached to the reagent dispensing mechanism 2, and rotates the reagent disk 15 to dispose the reagent container 14 immediately below the reagent absorption port 11. After the arrangement of the reagent container 14, the control unit 301 causes the reagent dispensing mechanism 2 to which the pierce 5 is attached to perforate the lid of the reagent container 14. After the perforation, the control unit 301 cleans the pierce 5 to prepare for the next perforation, and removes the pierce 5 to prepare for absorption of the reagent.

(S404)
The control unit 301 causes the RFID reader/writer 12 to update the reagent information stored in the RFID tag attached to the reagent container 14. That is, the state of the reagent container 14 stored in the RFID tag is updated from the unused state to the used state.

According to the flow of the processing described above, after the lid of the reagent container 14 is perforated, the state stored in the RFID tag attached to the reagent container 14 is updated. Therefore, the perforation is performed immediately before the use of the reagent, and the concentration of the reagent can be further prevented. After the flow of the processing in FIG. 4, the absorption of the reagent from the reagent container 14, the rotation of the reagent disk 15, and the control related to the reaction disk 1 may be performed as necessary.

Figure 5:
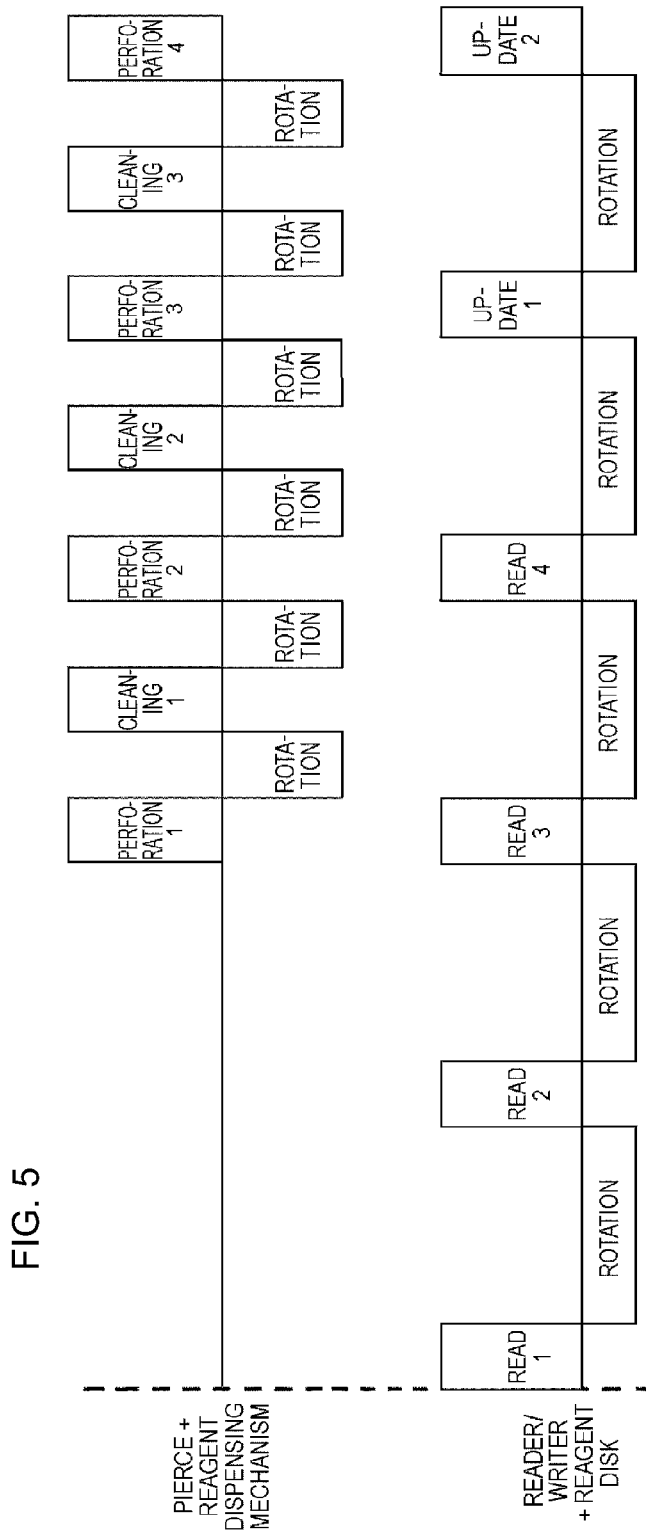
FIG. 5 is a diagram showing an example of a timing chart according to the first embodiment.

An example of a timing chart in the present embodiment will be described with reference to FIG. 5. FIG. 5 is an example of a timing chart when four unused reagent containers 14 are mounted on the reagent disk 15 at intervals of 90 degrees as shown in FIG. 3, the RFID reader/writer 12 is disposed at a position of 180 degrees from the reagent absorption port 11, and the reagent disk 15 rotates every 90 degrees.

First, the RFID reader/writer 12 reads the RFID tag of a first reagent container 14, and the reagent disk 15 rotates by 90 degrees. Next, the RFID reader/writer 12 reads the RFID tag of a second reagent container 14, and the reagent disk 15 further rotates by 90 degrees. At this time, since the first reagent container 14 is disposed immediately below the reagent absorption port 11 and is in the unused state, the lid is perforated by the pierce 5. At the same timing, the RFID reader/writer 12 reads the RFID tag of a third reagent container 14. While the reagent disk 15 further rotates by 90 degrees, a rotation operation of the reagent dispensing mechanism 2 and the cleaning and drying of the pierce 5 are performed. At this time, the second reagent container 14 which is in the unused state is disposed immediately below the reagent absorption port 11, the lid is perforated by the pierce 5, and the RFID tag of a fourth reagent container 14 is read by the RFID reader/writer 12. Thereafter, while the rotation operation of the reagent dispensing mechanism 2 and the cleaning and drying of the pierce 5 are performed, the reagent disk 15 rotates by 90 degrees, and the first reagent container 14 is disposed immediately below the RFID reader/writer 12. Since the first reagent container 14 is perforated, the state of the first reagent container 14 is updated to the used state by the RFID reader/writer 12, and the third reagent container 14 which is in unused state is perforated at the same time. Thereafter, the rotation of the reagent disk 15 and the cleaning and drying of the pierce 5, the perforation by the pierce 5 and the update of state by the RFID reader/writer 12 are repeated a predetermined number of times.

As in the timing chart shown in FIG. 5, the reading and writing of the RFID tag by the RFID reader/writer 12, the rotation of the reagent disk 15, the perforation and cleaning of the pierce 5 by the reagent dispensing mechanism 2, and the like are linked at appropriate timings. As a result, each operation can be executed in parallel. That is, every time the reagent disk 15 rotates by a predetermined angle, the perforation of the lid of the reagent container 14 by the pierce 5 as the perforation unit and the update of the state of the reagent container 14 by the RFID reader/writer 12 as the state updating unit are performed. As a result, the processing from the reading of the reagent information to the perforation of the reagent container 14 and the update of the RFID tag can be executed in a shorter time.

An arrangement angle between the reagent absorption port 11 and the RFID reader/writer 12 is not limited to 180 degrees shown in FIG. 3, and may be any angle. The interval of the arrangement angles of the reagent containers 14 on the reagent disk 15 and a scale of the rotation angle of the reagent disk 15 are not limited to 90 degrees shown in FIG. 3, and may be any angles. However, the arrangement angle between the reagent absorption port 11 and the RFID reader/writer 12 is preferably a multiple of the interval of the arrangement angles of the reagent containers 14 or the scale of the rotation angle of the reagent disk 15.

Second Embodiment

The first embodiment discloses that, when the unused reagent container 14 is perforated, the state of the reagent container 14 stored in the RFID tag attached to the reagent container 14 is updated to the used state. A medium for storing the state of the reagent container 14 is not limited to the RFID tag. The information to be stored is not limited to whether the reagent container 14 is in the unused state or in the used state. The present embodiment discloses that reagent information is stored in the storage unit 302 of the control device 300 instead of the RFID tag, and the stored information includes a date and time when the state of the reagent container 14 is updated and an absorption amount absorbed from the reagent container 14. The same components as those in the first embodiment are denoted by the same reference numerals, and the description thereof will be omitted.

Figure 6:
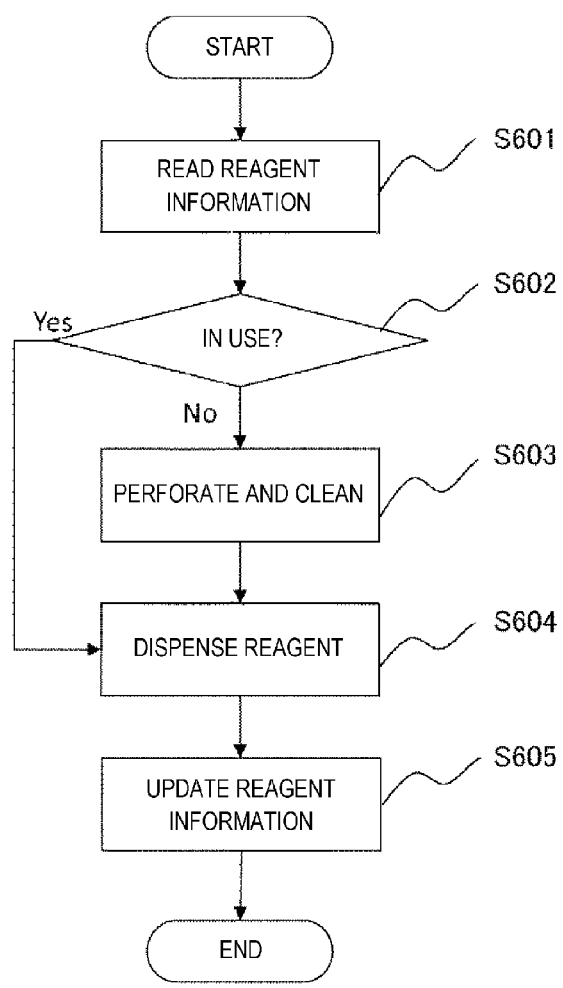
FIG. 6 is a diagram showing an example of a flow of processing according to a second embodiment.

The flow of the processing in the present embodiment will be described with reference to FIG. 6. In the present embodiment, an identification code, for example, a bar code is attached to each reagent container 14 instead of the RFID tag in the first embodiment, and a code reader, for example, a bar code reader is provided in the reagent jacket 10 instead of the RFID reader/writer 12.

(S601)

The identification code attached to the reagent container 14 mounted on the reagent disk 15 is read by the code reader as the reagent information. The identification code, which is the reagent information acquired by the reading of the code reader, is transmitted to the control unit 301 of the control device 300.

(S602)

The control unit 301 determines whether the reagent container 14 is in the used state. For determination in this step, a state table shown in FIG. 7 is used. The state table records the identification code, a state of each identification code, an update date and time, and the absorption amount as the reagent information, and is stored in the storage unit 302. That is, the storage unit 302 functions as a state storage unit. In the state, whether the reagent container 14 corresponding to the identification code is in the unused state or in the used state is recorded. That is, whether the reagent container 14 is in the used state is determined by referring to the state corresponding to the identification code acquired in S601 in the state table. When it is in the used state, the processing moves to S604. When it is not in the used state, that is, when it is in the unused state, the processing moves to S603.

In the update date and time of the state table, the date and time when the state of the reagent container 14 corresponding to the identification code is updated from the unused state to the used state is recorded. That is, the update date and time of the identification code in the unused state is blank. A total amount of the reagent absorbed from the reagent container 14 corresponding to the identification code is recorded in the absorption amount. That is, the absorption amount of the identification code in the unused state is blank or recorded as zero.

(S603)

The control unit 301 causes the pierce 5 to be attached to the reagent dispensing mechanism 2, and rotates the reagent disk 15 to dispose the reagent container 14 immediately below the reagent absorption port 11. After the arrangement of the reagent container 14, the control unit 301 causes the reagent dispensing mechanism 2 to which the pierce 5 is attached to perforate the lid of the reagent container 14. After the perforation, the control unit 301 cleans the pierce 5 to prepare for the next perforation, and removes the pierce 5 to prepare for the absorption of the reagent.

(S604)

The control unit 301 causes the reagent dispensing nozzle 2a of the reagent dispensing mechanism 2 to absorb the reagent, and causes the reagent dispensing nozzle 2a to discharge the reagent into the reaction container 16 to dispense the reagent. An amount of the reagent absorbed by the reagent dispensing nozzle 2a is temporarily stored in the storage unit 302 of the control device 300.

(S605)

The control unit 301 updates the reagent information recorded in the state table, and functions as a state updating unit. That is, the state of reagent container 14 which is in the unused state is updated to the used state, the date and time during updating is recorded in the update date and time, and the amount temporarily stored in S604 is added to the absorption amount and recorded.

The control unit 301 further calculates an elapsed time until a current time using a value of the update date and time, compares the calculated elapsed time with a preset threshold value, and displays a warning on the display unit 303 when the elapsed time exceeds the threshold value. Instead of displaying the warning on the display unit 303, the warning may be issued using an acoustic device, a light emitting lamp, or the like. That is, the display unit 303, the acoustic device, the light emitting lamp, and the like function as a warning unit.

The threshold value is set based on, for example, an expiration date of the reagent, and the expiration date may be used as the threshold, or a value obtained by subtracting a predetermined number of days, for example, one week, from the expiration date may be used as the threshold value. Since the warning is issued based on the comparison between the elapsed time and the threshold value, the concentration of the reagent can be further prevented.

The control unit 301 further compares the value of the absorption amount with a preset threshold value. When the absorption amount exceeds the threshold value, the control unit 301 causes the display unit 303 functioning as the warning unit to display the warning. The threshold value is set based on, for example, an accommodation amount that is the amount of the reagent accommodated in the reagent container 14, and a value obtained by subtracting a predetermined amount, for example, five absorption amounts from the accommodation amount may be used as the threshold value. Since the warning is issued based on the comparison between the absorption amount and the threshold value, replacement of the reagent container 14 can be set at an appropriate timing.

According to the flow of the processing described above, after the lid of the reagent container 14 is perforated, the state of the reagent container 14 recorded in the state table of the storage unit 302 is updated. Therefore, the perforation is performed immediately before the use of the reagent, and the concentration of the reagent can be further prevented. In addition, the warning is issued in accordance with the elapsed time since the lid of the reagent container 14 is perforated and a remaining amount of the reagent container 14. Therefore, it is possible to further prevent the concentration of the reagent and to set an appropriate replacement time of the reagent container 14.

The plurality of embodiments according to the invention are described above. The invention is not limited to the above embodiments, and the components may be modified without departing from the scope of the invention. Further, a plurality of constituent elements disclosed in the above embodiments may be appropriately combined. For example, in the first embodiment, a state table corresponding to the state table shown in FIG. 7 may be stored in an RFID tag, and a warning may be issued based on a comparison with a threshold value. Furthermore, a part of constituent elements may be omitted from all the constituent elements shown in the above embodiments.

REFERENCE SIGN LIST 1 reaction disk
2 reagent dispensing mechanism
2a reagent dispensing nozzle
3 specimen dispensing mechanism
3a specimen dispensing nozzle
4 cleaning and drying tank
5 pierce
6 pierce holding container
7 specimen rack
8 specimen container
9 rack transport mechanism
10 reagent jacket
11 reagent absorption port
12 RFID reader/writer
13 reagent jacket lid
14 reagent container
15 reagent disk
16 reaction container
17 spectrophotometer
18 cleaning mechanism
19 stirring mechanism
20 identification device
100 analysis module
200 rack transport module
201 rack supply unit
202 rack storage unit
203 rack transport line
204 specimen identification device
205 rack rotor
300 control device
301 control unit
302 storage unit
303 display unit
304 input unit
500 automatic analysis device

The invention claimed is:

1. An automatic analysis device comprising:
a plurality of reagent containers in each of which a reagent is accommodated and to each of which a perforable lid is attached;
a perforation unit that perforates the lid; and
a reagent absorption nozzle that is inserted in a hole formed by perforation and that absorbs the reagent,
the automatic analysis device further comprising:
a plurality of state storage units each associated with each of the plurality of reagent containers that stores whether a state of each of the plurality of reagent containers is an unused state or a used state;
a state updating unit that, when the lid is perforated by the perforation unit when the state of the reagent container is the unused state, updates the state stored in the state storage unit to the used state; and
a reagent disk which rotates and on which the plurality of reagent containers is mounted, wherein:
the automatic analysis device and the location of the plurality of reagent containers on the reagent disk are configured such that every time the reagent disk rotates by a predetermined angle, perforation of a lid of a first reagent container by the perforation unit and updating by the state updating unit of a state storage unit associated with a second reagent container different from the first reagent container are performed in parallel,
an arrangement angle between a reagent absorption port into which the perforation unit is inserted and the state updating unit is a multiple of a scale of a rotation angle of the reagent disk, and
the automatic analysis device and the location of the plurality of reagent containers on the reagent disk are further configured such that update of a state storage unit associated with the first reagent container in which the lid is perforated and perforation of a lid of a third reagent container different from the first reagent container and the second reagent container are executed in parallel.

2. The automatic analysis device according to claim 1, wherein
the state storage unit further stores a date and time updated from the unused state to the used state by the state updating unit, and
the automatic analysis device further comprises a warning unit that reads the date and time from the state storage unit and that issues a warning when an elapsed time from the date and time to a current time exceeds a preset threshold value.

3. The automatic analysis device according to claim 2, wherein
The preset threshold value is set based on an expiration date of the reagent.

4. The automatic analysis device according to claim 1, wherein
the state storage unit stores an absorption amount by which the reagent is absorbed,
the state updating unit updates the absorption amount each time the reagent is absorbed by the reagent absorption nozzle, and
the automatic analysis device further comprises a warning unit that reads the absorption amount from the state storage unit and that issues a warning when the absorption amount exceeds a preset threshold value.

5. The automatic analysis device according to claim 1, wherein
the state storage unit is an RFID tag attached to the reagent container, and
the state updating unit is an RFID reader/writer that reads and writes the RFID tag.

6. The automatic analysis device according to claim 1, further comprising:
an identification code attached to the reagent container, wherein
the state storage unit includes a state table that associates the identification code with the state of the reagent container, and
the state updating unit reads the identification code and updates the state in the state table corresponding to the read identification code.

7. An automatic analysis device comprising:
a plurality of reagent containers in each of which a reagent is accommodated and to each of which a perforable lid is attached;
a perforation unit that perforates the lid;
a reagent absorption nozzle that is inserted in a hole formed by perforation and that absorbs the reagent; and
a reagent disk on which the plurality of reagent containers is mounted,
the automatic analysis device further comprising:
a plurality of RFID tags, one RFID tag being attached to each of the plurality of reagent containers and storing whether a state of the reagent container is an unused state or a used state; and
an RFID reader/writer provided on the reagent disk to read and write the each RFID tag, wherein
the automatic analysis device and location of the plurality of reagent containers on the reagent disk are configured such that every time the reagent disk rotates by a predetermined angle, the perforation of a lid by the perforation unit of a first reagent container and updating by the RFID reader/writer of a state of an RFID tag attached to a second reagent container different from the first reagent container are performed in parallel,
an arrangement angle between a reagent absorption port into which the perforation unit is inserted and the RFID reader/writer is a multiple of a scale of a rotation angle of the reagent disk, and
the automatic analysis device and the location of the plurality of reagent containers on the reagent disk are further configured such that update of a state of an RFID tag attached to the first reagent container in which the lid is perforated and perforation a lid of a third reagent container different from the first reagent container and of the second reagent container are executed in parallel.

* * * * *